United States Patent [19]

Arterbury et al.

[11] Patent Number: 5,088,554
[45] Date of Patent: Feb. 18, 1992

[54] SINTERED METAL SAND SCREEN

[75] Inventors: Bryant A. Arterbury; James E. Spangler, both of Houston, Tex.

[73] Assignee: Otis Engineering Corporation, Carrollton, Tex.

[21] Appl. No.: 601,271

[22] Filed: Oct. 22, 1990

[51] Int. Cl.$^5$ .................. B01D 39/20; E21B 43/08
[52] U.S. Cl. .................. 166/228; 29/163.8; 210/500.25; 210/510.1; 419/28
[58] Field of Search .............. 166/227, 228, 278; 210/500.25, 510.1, 497.01; 29/163.6, 163.8, 902; 419/8, 28

[56] References Cited

U.S. PATENT DOCUMENTS

| | | | |
|---|---|---|---|
| 1,874,035 | 8/1932 | Fletcher | 166/228 |
| 2,554,343 | 5/1951 | Pall | 210/510.1 |
| 2,600,150 | 6/1952 | Abendroth | 166/228 |
| 2,826,805 | 3/1958 | Probst et al. | 210/510.1 |
| 2,963,163 | 12/1960 | Veres | 29/163.8 |
| 3,033,783 | 5/1962 | Lubben | 29/163.8 |
| 3,201,858 | 8/1965 | Valyi | 29/163.8 |
| 3,313,621 | 4/1967 | Mott | 419/36 |
| 3,567,437 | 3/1971 | Mott | 419/42 |
| 3,605,245 | 9/1971 | Zapf | 419/39 |
| 3,632,243 | 1/1972 | Mott | 425/78 |
| 3,746,642 | 7/1973 | Bergstrom | 210/446 |
| 3,785,038 | 1/1974 | Zapf | 419/28 |
| 3,897,531 | 7/1975 | Overhoff et al. | 264/109 |
| 4,071,937 | 2/1978 | Rohlig | 419/8 |
| 4,072,616 | 2/1978 | Rohlig | 210/493.5 |
| 4,088,580 | 5/1978 | Spurlock | 166/228 |
| 4,186,100 | 1/1980 | Mott | 210/496 |
| 4,217,141 | 8/1980 | Schrittwieser | 75/244 |
| 4,483,820 | 11/1984 | Schelb | 419/28 |
| 4,705,611 | 11/1987 | Grimes et al. | 204/129.1 |
| 4,755,265 | 7/1988 | Young | 204/45.1 |
| 4,811,790 | 3/1989 | Jennings, Jr. et al. | 166/278 |
| 4,821,800 | 4/1989 | Scott et al. | 166/228 |

OTHER PUBLICATIONS

The Pall Porous Metals Filter Guide, Pall Trinity Micro Corp., Sep. 1978.
Faust, Charles L., "Electropolishing I-The Practical Side", Metal Finishing, Jul. 1982, pp. 21-25.
Faust, Charles L., "Electropolishing-The Practical Side II", Metal Finishing, Aug. 1982, pp. 59-63.
Faust, Charles L., "Electropolishing-Stainless Steel", Metal Finishing, Sep. 1982, pp. 89-93.
Faust, Charles L., "Electropolishing-Stainless Steel, Part II", Metal Finishing, Nov. 1982, pp. 65-67.

Primary Examiner—Stephen J. Novosad
Attorney, Agent, or Firm—Dennis T. Griggs

[57] ABSTRACT

A tubular sand screen is made in one piece entirely of powdered metal slivers which are molded and sintered to form a metallurgically integral rigid tubular structure. Aggregate metal particles, for example, stainless steel slivers, are bonded together by interatomic diffusion as a result of sintering the compacted slivers under high temperature and pressure conditions. The sintered metal sand screen performs the function of the conventional prepack assembly as well as the screen function. In one aspect of the invention, the sintered metal screen is subjected to electropolishing to yield an effective porosity of 40-60 mesh, with an average pore size of 150 microns. Most of the surface irregularities are removed by electropolishing, and very few nucleation sites remain where particles in the size range of 74 microns-100 microns can become captured or otherwise lodged to cause plugging of the screen.

19 Claims, 5 Drawing Sheets

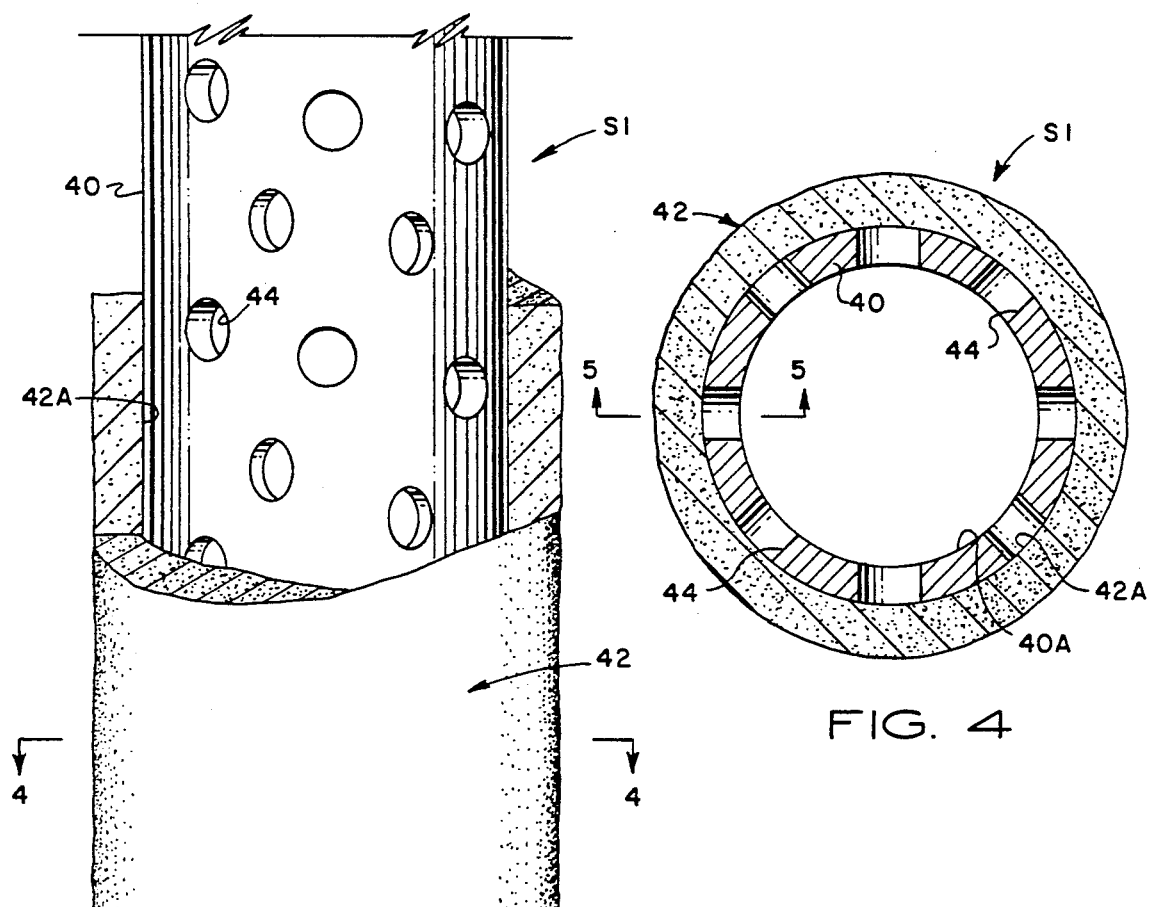
FIG. 4
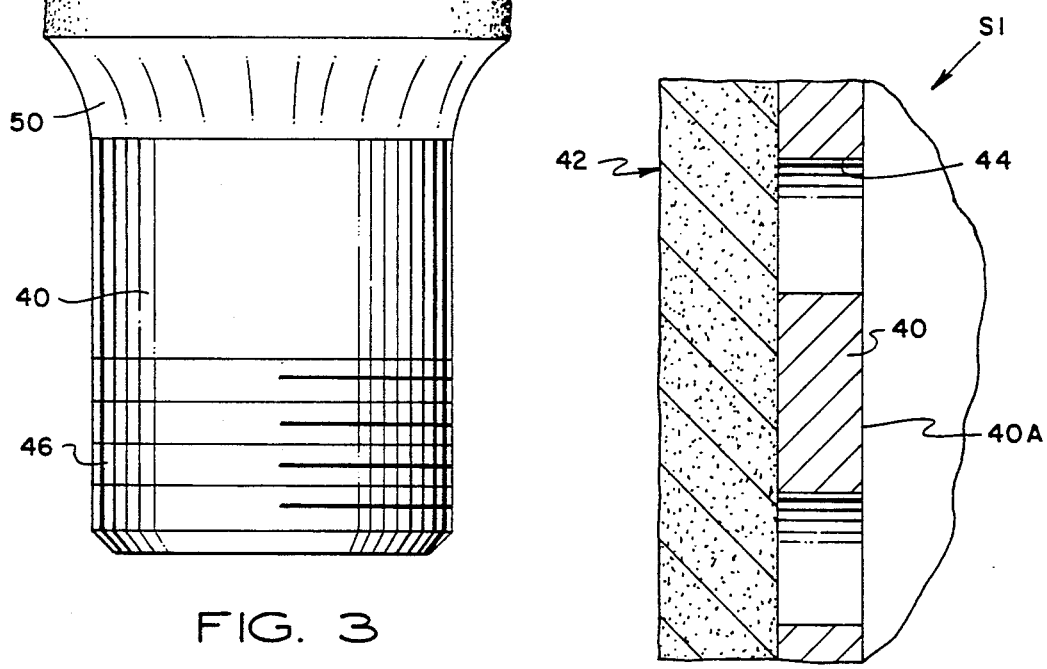
FIG. 3
FIG. 5

SINTERED METAL SAND SCREEN

FIELD OF THE INVENTION

This invention relates generally to apparatus for completing downhole wells, and in particular to well screens for filtering unconsolidated material out of inflowing well fluid in water, oil, gas and recovery wells.

BACKGROUND OF THE INVENTION

In the course of completing an oil and/or gas well, it is common practice to run a string of casing into the well bore and then to run the production tubing inside the casing. At the well site, the casing is perforated across one or more production zones to allow production fluids to enter the casing bore. During production of the formation fluid, formation sand is also swept into the flow path. The formation sand is relatively fine sand that erodes production components in the flow path.

In some completions, the well bore is uncased, and an open face is established across the oil or gas bearing zone. Such open bore hole (uncased) arrangements are utilized, for example, in water wells, test wells and horizontal well completions.

One or more sand screens are installed in the flow path between the production tubing and the perforated casing (cased) or the open well bore face (uncased). A packer is customarily set above the sand screen to seal off the annulus in the zone where production fluids flow into the production tubing. The annulus around the screen is packed with a relatively coarse sand or gravel which acts as a filter to reduce the amount of fine formation sand reaching the screen. A work string and service seal unit (SSU) is used to spot the gravel around the screen. During well completion, gravel is also pumped and squeezed into the producing formation around the screen for filtering unconsolidated material out of the infilling well fluid. The gravel is pumped down the work string in a slurry of water or gel and is spotted directly under the packer or above the sand screen. The gravel also fills the annulus between the sand screen and the well casing. In well installations in which the screen is suspended in an uncased open bore, the gravel pack supports the surrounding unconsolidated formation.

DESCRIPTION OF THE PRIOR ART

Conventional sand screens employ a perforated mandrel which is surrounded by longitudinally extending spacer bars, rods or ribs and over which a continuous wire is wrapped in a carefully spaced spiral configuration to provide a predetermined longitudinal gap between the wire turns. See, for example, U.S. Pat. No. 3,785,409; U.S. Pat. No. 3,958,634; and U.S. Pat. No. 3,908,256, all assigned to Howard Smith Screen Company of Houston, Tex., and each being incorporated herein by reference. The aperture between turns permits formation fluids to flow through the screen, while the closely spaced wire turns exclude fine particulate material such as sand or gravel which may penetrate the gravel pack.

A problem which arises during initial production following the gravel packing operation is that fine sand may be carried through the gravel pack before the gravel pack bridge stabilizes. It is not unusual to produce a substantial amount of such fine sands before the gravel pack finally consolidates and yields clean production. During the early stages of producing the well after gravel packing, those fines tend to migrate through the gravel pack and screen and lodge within the inner annulus between the outer wire wrap and the perforated mandrel. In some instances, this can cause severe erosion of the screen and ultimate failure of the screen to reduce sand invasion. In other situations, the sand fines may include plugging materials which are carbonaceous, siliceous or organic solids which can completely plug the mandrel flow passages and terminate production shortly after completion. In deep wells, when the screen becomes plugged and the pressure in the production tubing is reduced, the formation pressure can collapse the screen and production tubing. Moreover, when a substantial amount of sand has been lost from the surrounding formation, the formation may collapse with resultant damage to the well casing or liner and consequent reduction or termination of production.

One attempt to overcome the foregoing plugging problem is to interpose a prepack of gravel within the annulus between the inner mandrel and the outer wire screen. The prepacked gravel is sized appropriately to exclude the fines which accompany the formation fluid during initial production. Raw gravel, as well as epoxy resin coated gravel, have been used extensively in prepacked well screens. Some prepacked well screens are subject to retrieval problems due to their outer diameter being larger than that of a conventional well screen. In order to make prepacked well screens more easily retrievable, the inner mandrel is usually downsized, therefore imposing restrictions on both production and completion tool string bore sizing.

Some prior art well screens have utilized an inner wire cloth or steel wire woven fabric filter media in order to achieve maximum annular placement and retention of prepacked filter materials. See, for example, U.S. Pat. No. 4,858,691 and U.S. Pat. No. 4,856,591. Such woven wire retainers do not provide free flow comparable to the conventional rib-channel design which is characteristic of resistance welded well screens. The wire mesh retainer which is wrapped directly onto the perforated mandrel only permits free flow to occur where it overlaps flow passages on the mandrel. Even in this instance, flow through the perforations is further restricted where the wire mesh retainer overlaps itself.

The prior art sand screens which utilize fine wire woven retainers can result in plugging due to the fact that the openings in the wire mesh are typically considerably smaller than the flow openings in the outer screen member. In U.S. Pat. No. 4,858,691, for example, the woven wire retention mesh is stated to have a mesh size of from about 40 to about 200, which provides a substantially smaller inlet flow area than the inlet flow area of the outer particulate restricting cylinder. It will be seen that sand plugging can interfere with the initial development phase of production in wells which are completed by woven wire screens of the type described in U.S. Pat. No. 4,858,691.

OBJECTS OF THE INVENTION

The principal object of the present invention is to provide a tubular sand screen of porous, aggregate material which is sized appropriately to exclude sand fines of a predetermined size, and which is porous and inherently stable with a mechanical strength comparable to conventional wire wound screens, but which does not require wires, ribs, spacer bars and the like.

A related object of the invention is to provide a tubular sand screen of stabilized aggregate material which is resistant to acid treatment and stimulation compounds, as well as high chloride/high temperature well conditions.

Yet another object of the present invention is to provide an improved sand filter which is adapted for use in well completions having a relatively low entrance velocity of formation fluids, for example, in horizontal completions.

Another object of the present invention is to provide an improved sand screen of an inherently stable aggregate material which can be molded, machined, threaded, cut to size, welded and worked in the same manner and with the same tools as conventional production tubing.

A related object of the invention is to provide an improved well screen of the character described, in which the inherently stable, porous aggregate material can be fabricated in tubular form to any desired length, and which can be machined and worked in the same manner as conventional production tubing.

A related object of the present invention is to provide an improved sand screen of inherently stable, porous aggregate material which is resistant to plugging by sand fines.

Still another object of the present invention is to provide a unitary, tubular sand screen of inherently stable, porous aggregate material, having integrally formed, threaded end fittings for attachment directly to production tubing.

Another object of the invention is to provide a sand screen which can exclude sand fines from inflowing formation fluid during the initial production phase following gravel pack a operation, without limiting production of formation fluid.

A related object of the present invention is to maximize the volume of aggregate materials in a sand screen having a maximum inner diameter and a minimum outer diameter.

SUMMARY OF THE INVENTION

The foregoing objects are achieved according to one aspect of the present invention by a tubular sand screen which is made in one piece entirely of sintered powdered metal which is molded to form a metallurgically integral rigid tubular structure. The term "metallurgically integral" as used herein means that the aggregate metal particles are bonded together by interatomic diffusion as a result of sintering the particles under high temperature and pressure conditions.

According to another aspect of the invention, the sintered metal screen is subjected to electropolishing to improve its corrosion resistance, reduce mechanical stress, reduce surface friction and reduce the incidence of plugging by sand fines and other particulates, for example, in the range of 74 microns–100 microns. Additionally, the porosity is increased by the electropolishing procedure to yield a screen having an effective porosity of 40–60 mesh, with an average pore size of about 150 microns.

In a first embodiment, the tubular, sintered metal sand screen is mounted onto a perforated mandrel in a continuous length, for example, 20 to 30 feet. In this configuration, the collapse strength and tensile strength of the sand screen is comparable to that of conventional prepack sand screens, and the tubular sintered metal sand screen performs the function of the conventional prepack assembly as well as the screen function.

In an alternative embodiment of the invention, the inner mandrel is not utilized, and the sintered metal sand screen has threaded pin and box end fittings integrally formed on a unitary tubular body, with the external surface of the sand screen being free of welds and surface distortion. In this unitary embodiment, the sintered metal sand screen is provided with a maximum inner diameter and a minimum outer diameter.

Because helically wrapped wires and longitudinal spacer bars are not utilized, the radial thickness of the sintered metal sand screen body provides the prepack gravel function with the desired porosity without imposing a reduction on the production bore size.

Other features and advantages of the present invention will be appreciated by those skilled in the art upon reading the detailed description which follows with reference to the attached drawings.

BRIEF DESCRIPTION OF THE DRAWINGS

FIG. 3 is a front elevational view, partially broken away, of the sand screen shown in FIG. 2;

FIG. 4 is a right sectional view taken along the line 4—4 of FIG. 3;

FIG. 5 is a longitudinal sectional view taken along the line 5—5 of FIG. 4;

DETAILED DESCRIPTION OF THE PREFERRED EMBODIMENTS

Figure 1:
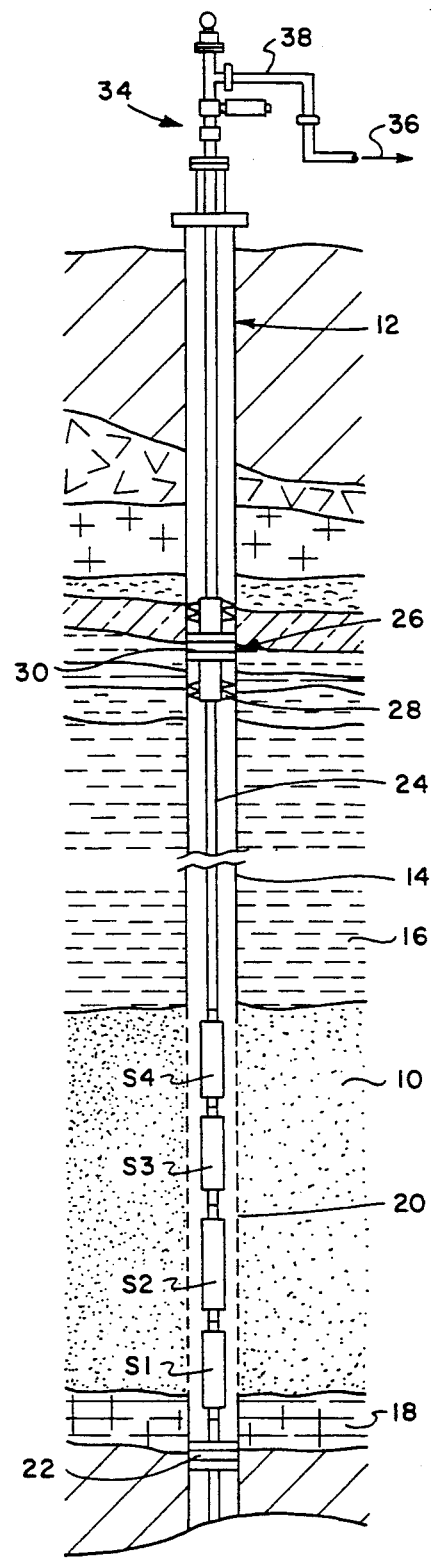
FIG. 1 is a simplified schematic diagram showing a vertical section through a hydrocarbon formation which is intersected by a production well which has been completed with multiple sand screens constructed according to the teachings of the present invention.
Figure 2:
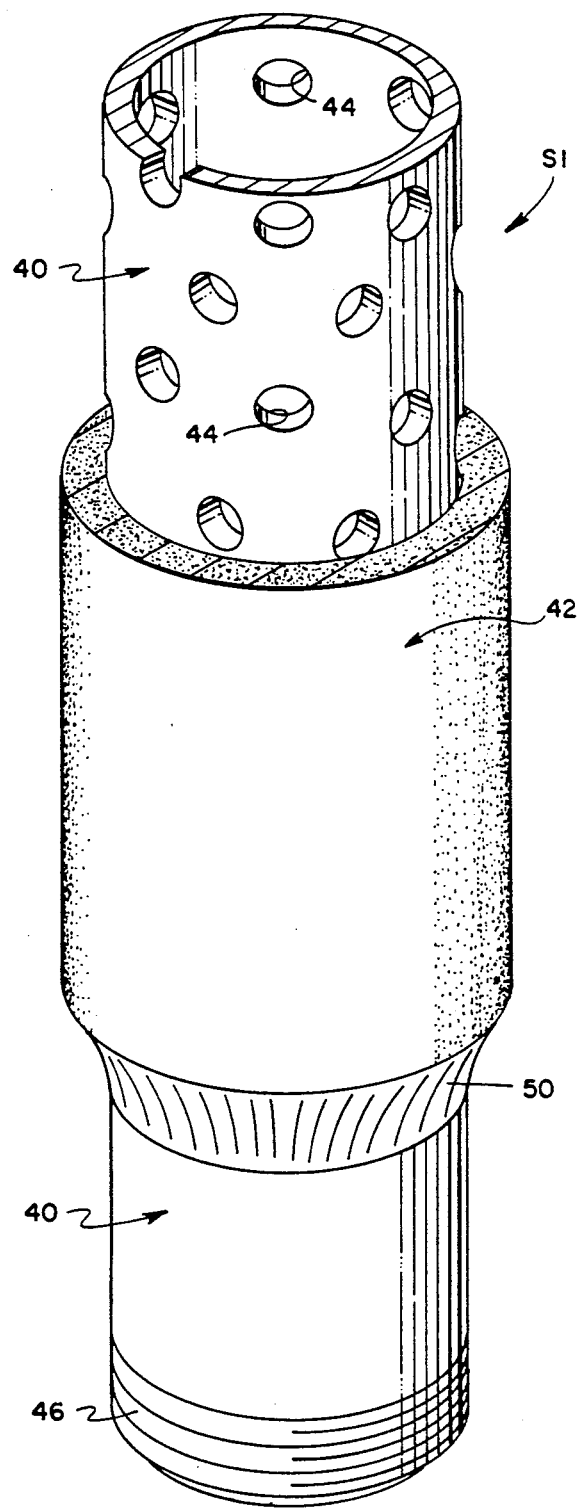
FIG. 2 is a perspective view, partially broken away, of a sintered metal sand screen assembled onto a supporting mandrel.

In the description which follows, like parts are indicated throughout the specification and drawings with the same reference numerals, respectively.

Referring now to FIG. 1, a hydrocarbon formation 10 is intersected by a production well 12. A tubular string of well casing 14 extends through multiple layers of overburden 16, traversing the hydrocarbon formation 10, and intersecting one or more layers of underburden 18. The tubular casing sections 14 which intersect the hydrocarbon formation 10 are perforated by multiple openings 20 formed through the casing sidewall to permit inflow of formation fluids from the adjoining hydrocarbon bearing formation 10. The well casing 14 is sealed by a bottom packer 22 which is installed in sealed engagement against the inside bore of the well casing 14, preferably at an elevation below the hydrocarbon bearing formation 10.

The hydrocarbon formation 10 is confined vertically between the overburden layer 16 and the underburden layer 18, typically of an impervious siltstone or other barren rock. The sand screen of the invention is particularly well adapted to a generally horizontally aligned hydrocarbon formation, such as the formation 10 as illustrated, having a thickness ranging from about 100 feet to about 500 feet. For illustrative purposes, the hydrocarbon formation 10 is described at a depth of 7,500 feet, with a reservoir pressure of 2,000 psi and a reservoir temperature of 130 degrees F. The overburden layer 16 and subjacent underburden layer 18 are impervious to the flow of gas.

The production well 12 is completed by multiple tubular screens S1, S2, S3, S4 which are supported by a lower production tubing string 24 suspended from a production packer 26. The production packer 26 includes anchor slips 28 and an elastomeric seal 30 which releasably secure and seal the packer against the bore of the tubular well casing 14. Formation fluid produced through the screens S1-S4 and the production tubing 24 flows to the surface through an upper tubing string 32 to a wellhead assembly 34. The wellhead assembly supports the upper end of the production tubing string 32 and seals the casing 14. Formation fluid 36 is conveyed to a surface reservoir through a flow line 38.

Referring now to FIGS. 2, 3, 4 and 5, the construction of the sand screen S1 is typical of the sand screens S2, S3 and S4. The sand screen S1 includes a tubular mandrel 40 on which a tubular sand screen body 42 of predetermined length, for example, 20 feet. The tubular mandrel 40 is perforated by radial bore flow passages 44 which follow parallel spiral paths along the length of the mandrel 40. The radial bore flow passages 44 provide for fluid flow through the mandrel to the extent permitted by the external sintered metal sand screen body 42. The bore flow passages 44 may be arranged in any desired pattern and may vary in number, for example, 95 holes per foot, in accordance with the area needed to accommodate the expected formation fluid flow through the production tubing 24.

The perforated mandrel 40 preferably is fitted with a threaded pin connection 46 and a threaded box connection 48 at its opposite ends for threaded coupling with the production tubing 24 and with the other sand screens. The sintered metal body 42 is attached onto the mandrel 40 at opposite end portions thereof by annular end welds 50.

The screen body 42 is a fluid porous, particulate restricting member which is formed separately from the mandrel 40. In the preferred embodiment, the screen body 42 is a unitary, porous body of sintered powdered metal. The metal preferably is a corrosion resistant metal such as stainless steel or nickel and nickel chromium alloys such as are sold under the trademarks MONEL and INCONEL. Preferably, the sintered metal screen body 42 provides a matrix having a pore size of about 100-150 microns, corresponding to 40-60 mesh.

The sintered metal tubular screen 42 is fabricated by an isostatic press technique. In the isostatic press technique, powdered metal of an appropriate particle size, for example, 0.001-0.002 inch stainless steel slivers, are poured into a tubular mold of the appropriate length and diameter. The powdered metal is then pressed within the mold at 65,000 psi for twenty minutes to two hours to form a powdered metal tube. The compressed, powdered metal tube is then transferred to a sintering oven which is heated to 1,600-1,800 degrees F for several hours. After the sintering cycle has been completed, the compressed tube is allowed to cool and undergoes further processing in which it is cut to the desired length and is machined to form threaded pin and box fittings.

As a result of the foregoing sintering process, the sand screen body 42 is made entirely of sintered powdered metal which is molded to form a metallurgically integral rigid tubular structure. During the heating step, the aggregate metal slivers are bonded together by interatomic diffusion as a result of sintering the particles under high temperature and pressure conditions. The porosity is proportional to the initial particle size and the isostatic pressure. Stainless steel slivers having an average length of 0.001-0.002 inch when compressed at 60,000 psi and sintered at 1,800 degrees F as set forth above will yield pores of about 100 microns, which corresponds with about 40 mesh.

It is desirable to obtain a pore size yield which will permit the passage of sand fines in the range of 74 microns-100 microns, which is the size of fine sand particles which are produced during the early stages of production before the gravel pack finally consolidates and yields clean production. Accordingly, in some applications, it is desirable to increase the porosity to the range of 100 to 200 microns which will permit passage of fines in the range of 74-100 microns, but which will exclude larger particles which may cause plugging before the gravel pack consolidates.

According to another aspect of the invention, the sintered metal screen body 42 is subjected to electropolishing to increase its porosity to yield a screen having an effective porosity of 40-60 mesh, with the pore size in the range of 100-200 microns, and with an average pore size of about 150 microns.

This is accomplished in the preferred embodiment by electropolishing the sintered metal sand screen body 42. Electropolishing is an electrochemical process where metal is removed rather than deposited. In the electropolishing process, the sintered metal body 42 forms the anode in an appropriate electrolyte bath which, when voltage is applied, forms a polarized skin or film over the entire surface of the sintered metal body 42. The film is the thickest over the microdepressions and thinnest over the microprojections on the surface of the sintered metal screen body. Where the polarized film is the thinnest, the electrical resistance is the least and therefore the rate of metallic dissolution is the greatest. Accordingly, in the electropolishing step, the microscopic high points on the surface of the screen are selectively removed much faster than the microscopic valleys, thereby yielding a very flat, smooth and bright surface.

An unexpected benefit of the electropolishing process is that the pore size is increased as sintered metal material is removed from the microscopic valleys. For the previous example of a sintered metal screen body 42 made of 0.001–0.002 inch slivers of stainless steel compacted at 60,000 psi, an initial average pore size of about 100 microns or less was achieved. However, after electropolishing to produce a smooth surface, the average pore size was increased to about 150 microns, which is equivalent to 40–60 mesh.

As a result of the electropolishing, corrosion resistance is improved by removing scratches, metal debris and embedded abrasive particles. Mechanical stress is removed as a result of the electropolishing step by removing surface damage and cold work effects from the surface skin of the tubular screen 42. Moreover, the electropolishing procedure produces a non-particulating surface on the sintered metal sand screen by providing as much as 90 percent reduction in the external surface area. By removing most of the surface irregularities, very few nucleation sites remain where particles in the size range of 74 microns–100 microns can become captured or otherwise lodged to cause plugging. Electropolishing further reduces the coefficient of friction of the external surface of the sintered metal sand screen because rough projections on the surface are either removed or rounded.

Figure 6:
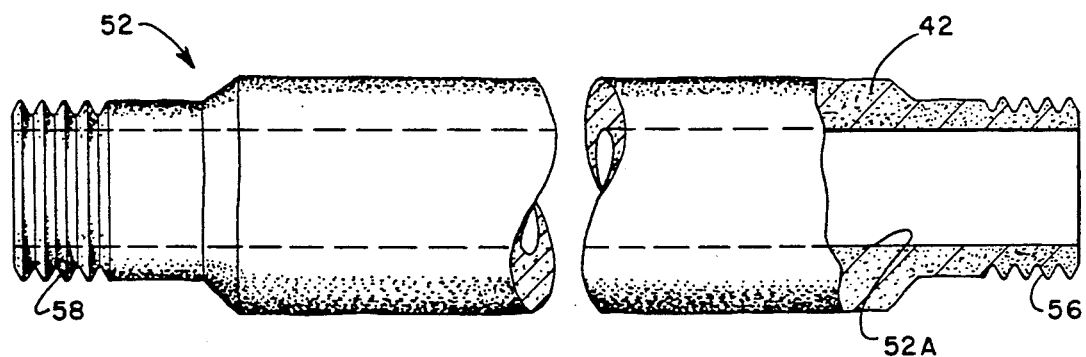
FIG. 6 is an elevational view, partially broken away, of a sintered metal sand screen having integrally formed end fittings.
Figure 7:
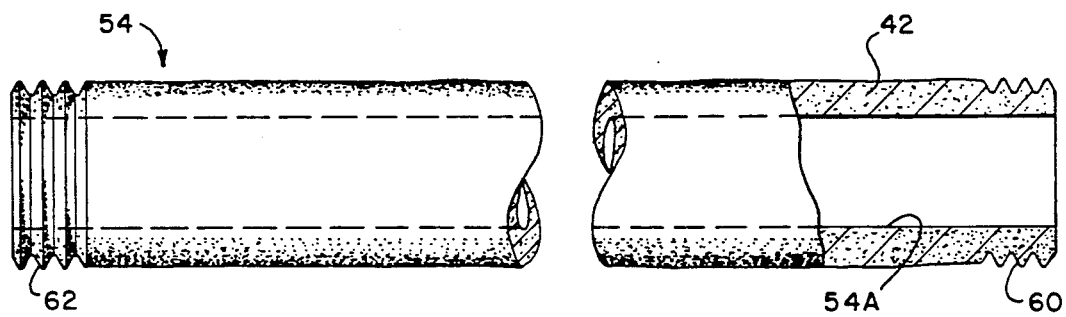
FIG. 7 is a view similar to FIG. 6 in which the inside diameter bore of the sintered metal sand screen is maximized.

Referring now to FIG. 6 and FIG. 7, alternative sintered metal sand screen embodiments 52, 54 are illustrated. In both embodiments, the inner mandrel 40 is not utilized, and the sintered metal sand screen body 42 has threaded end fittings 56, 58 at opposite ends for connection to an internally threaded coupling collar. The sand screen 54 is likewise provided with threaded end fittings 60, 62 for attachment to internally threaded coupling collars. In the embodiment of FIG. 6, the sand screen body 42 is provided with maximum radial thickness for maximum mechanical strength and resistance to mechanical stress, and the bore 52A of the sand screen 52 is maximized.

In the sand screen configuration of FIG. 7, the wall thickness of the sand screen 54 is reduced, thereby permitting the sand screen bore diameter 54A to be increased. In the FIG. 7 arrangement, the sintered metal sand screen 54 is provided with a maximum inner diameter and a minimum outer diameter.

Figure 8:
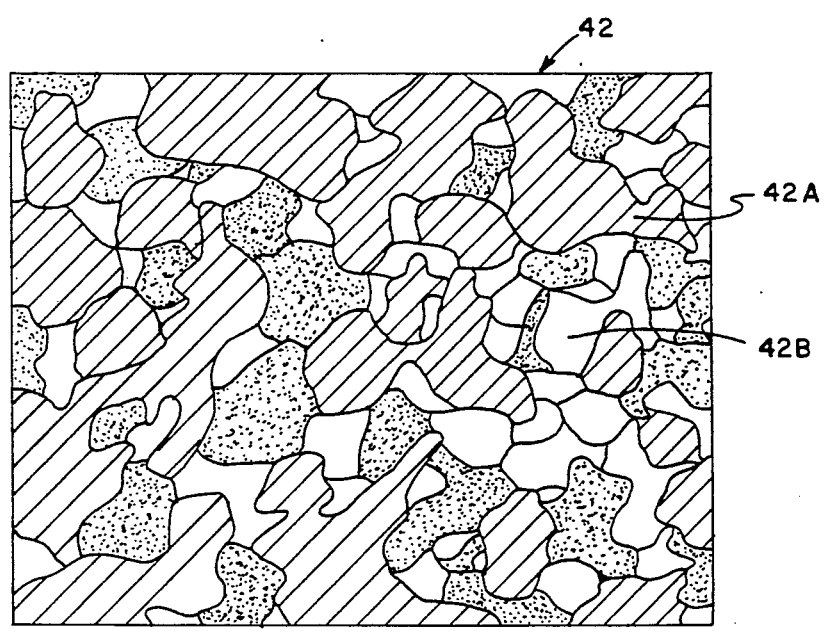
FIG. 8 is a greatly enlarged pictorial representation of a microscopic section taken through an external surface region of a sintered metal sand filter made according to the present invention.

The microscopic section shown in FIG. 8 illustrates the enlargement of the matrix pores obtained by electropolishing the sintered metal sand screen body 42. It will be noted that the edges of each particle 42A are rounded, and that the pore openings 42B, although irregular in shape, have an average size of from about 100 to 200 microns.

Figure 9:
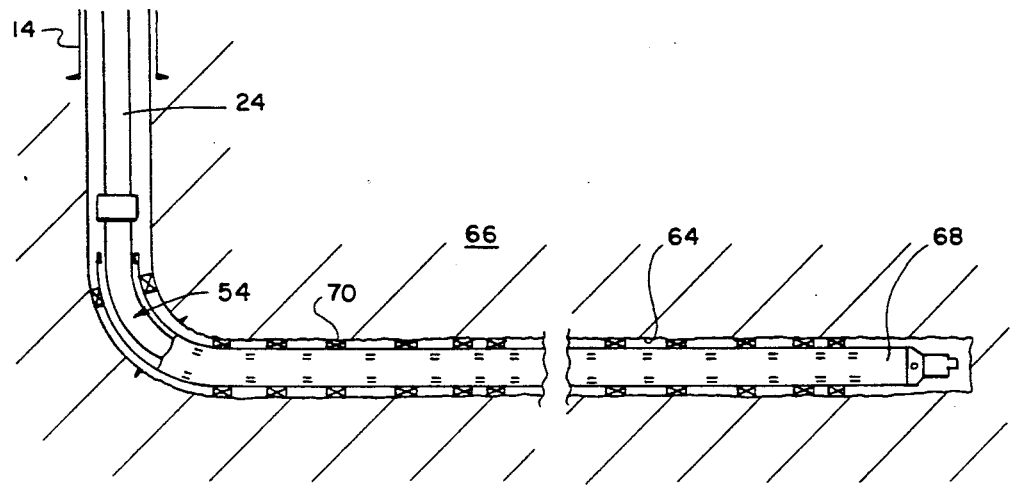
FIG. 9 is a simplified sectional view which illustrates the installation of the sintered metal sand screen of the present invention in a horizontal well completion.
Figure 10:
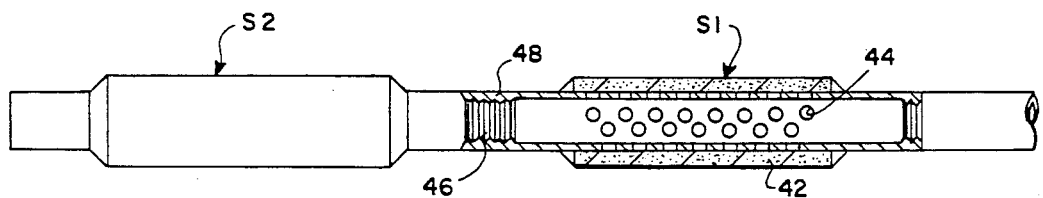
FIG. 10 is an elevation view, partly broken away and partly in section, of two mandrel mounted, sintered metal sand screens assembled together.

Referring now to FIG. 9, FIG. 10, FIG. 11 and FIG. 12, multiple sand screen sections S1, S2, S3, . . . having sintered metal body construction are illustrated in horizontal well completions. In FIG. 9, the serially connected sand screens S1, S2, S3, . . . are inserted into a horizontal well bore 64 which penetrates horizontally through a narrow producing formation 66. The horizontally extending formation 66 varies from about 20 feet in depth to about 500 feet in depth, and extends through a horizontal range, typically about 500 to 4,000 feet. The horizontal well bore 64 is reinforced by a slotted liner 68 which is supported within the horizontal bore by inflatable casing annulus packers 70, which isolate fracture zones.

Figure 11:
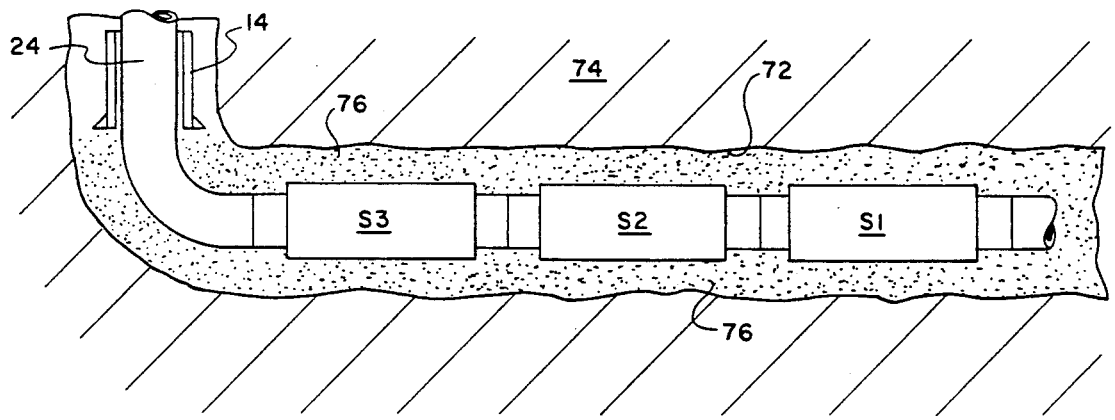
FIG. 11 is a simplified sectional view which illustrates a horizontal well completion in an uncased bore hole; and, FIG. 12 is a simplified schematic diagram showing a horizontal completion through a thin hydrocarbon producing formation.

In FIG. 11, the sintered metal sand screens S1, S2, S3 are shown installed in an uncased horizontal bore 72 which penetrates horizontally through an unconsolidated formation 74. Gravel 76 is squeezed into the annulus between the sand screens S1, S2 and S3 to provide support for the surrounding unconsolidated formation 74.

Figure 12:
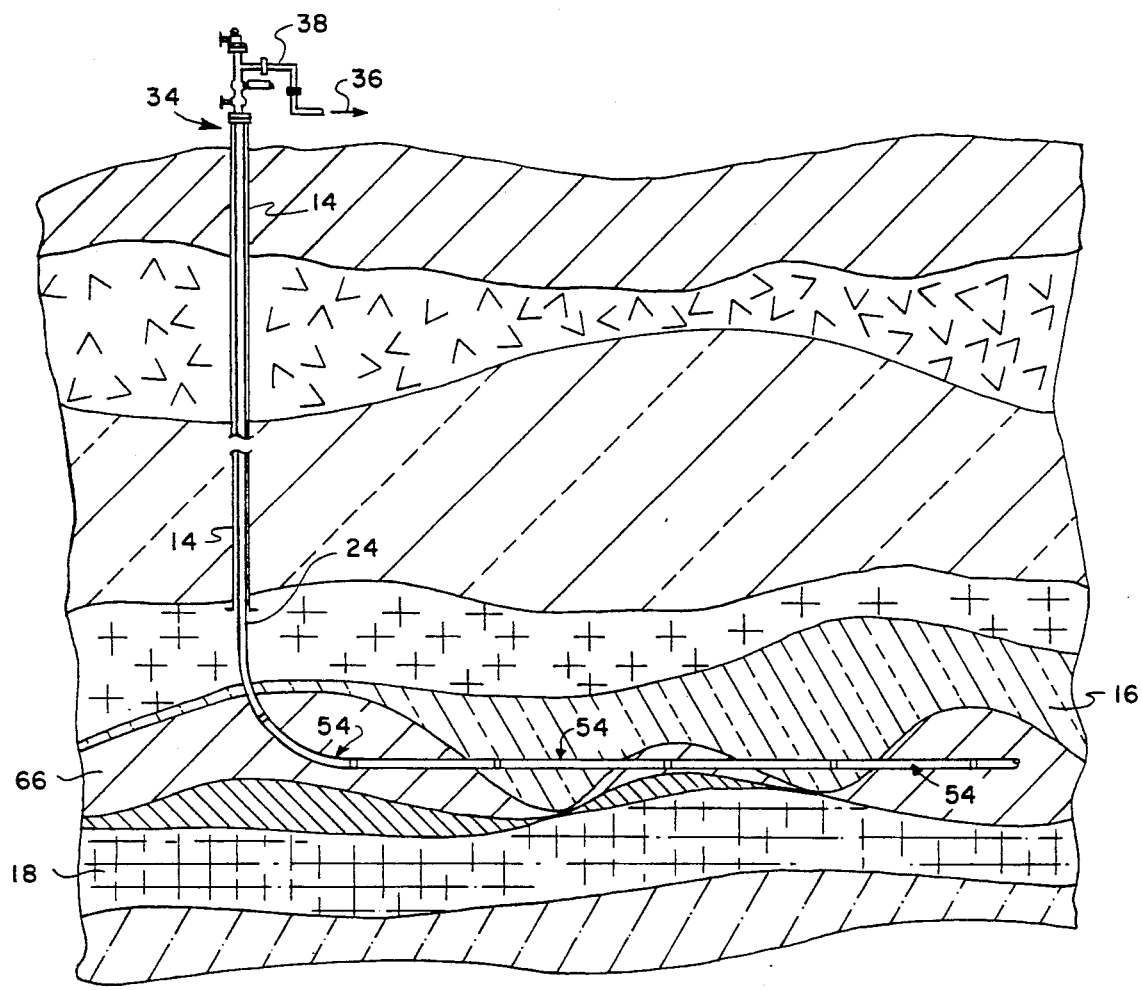

In FIG. 12, multiple sections 54 of sintered metal sand screen, constructed with integrally formed fittings as shown in FIG. 7, are coupled together and extend several hundred feet across three producing formations in a horizontal completion.

The invention has been described with reference to certain exemplary embodiments, and in connection with vertical as well as horizontal well completions. Various modifications of the disclosed embodiments as well as alternative well completion applications of the invention will be suggested to persons skilled in the art by the foregoing specification and illustrations. It is therefore contemplated that the appended claims will cover any such modifications or embodiments that fall within the true scope of the invention.

What is claimed is:

1. A well screen assembly for separating particulated material from formation fluid comprising, in combination:

a mandrel having a tubular sidewall and longitudinally spaced apertures formed radially therethrough; and, a well screen mounted on said mandrel, said well screen being a tubular body of sintered powdered metal, said tubular well screen body having an external surface which has been smoothed by electropolishing.

2. A well screen assembly as defined in claim 1, wherein the powdered metal is stainless steel.

3. A well screen assembly as defined in claim wherein the powdered metal is nickel.

4. A well screen assembly as defined in claim 1, wherein the powdered metal comprises nickel chromium alloy.

5. A well screen assembly as defined in claim 1, wherein the powdered metal comprises metal slivers having an average length in the range of 0.001–0.002 inches, and having a diameter which is substantially less than length.

6. A well screen for separating unconsolidated material out of inflowing well fluid in water, oil, gas and recovery wells comprising a tubular, porous body of sintered powdered metal, said tubular well screen body having an external surface which has been smoothed by electropolishing.

7. A well screen as defined in claim 6, wherein the powdered metal is stainless steel.

8. A well screen as defined in claim 6, wherein the powdered metal is nickel.

9. A well screen as defined in claim 6, wherein the powdered metal comprises nickel chromium alloy.

10. A well screen as defined in claim 6, wherein the powdered metal comprises metal slivers having an average length in the range of 0.001–0.002 inches.

11. A well screen as defined in claim 6, wherein said tubular, porous body has threaded fittings formed on opposite ends, respectively, for connection to threaded coupling collars.

12. A well screen as defined in claim 6, wherein said tubular, porous body has a central body portion disposed between first and second radially stepped end portions, said first and second radially stepped end portions each having threaded fittings for connection to threaded coupling collars.

13. A method for making a well screen comprising the steps:
   forming a unitary, porous tubular body of sintered powdered metal; and,
   electropolishing said sintered body.

14. The method for making a well screen as defined in claim 12, wherein the forming step is performed by:
   depositing metal slivers into a mold;
   compressing the slivers within the mold; and,
   baking the compressed slivers in an oven at a temperature sufficient to cause the slivers to become bonded together by interatomic diffusion.

15. The method for making a well screen as defined in claim 13, wherein the forming step is performed by:
   producing metal slivers in average lengths of 0.001–0.002 inches;
   compressing the slivers to approximately 60,000 to approximately 65,000 pounds per square inch within a mold; and,
   baking the compressed slivers in an oven at a temperature of from about 1,600 to about 1,800 degrees F until the slivers become tacky and bond to each other.

16. The method for making a well screen as defined in claim 13, wherein the forming step is performed by:
   depositing metal slivers into a mold;
   compressing the slivers within the mold until the slivers are united in an interlocking union; and,
   baking the compressed slivers in an oven at a temperature sufficient to cause the slivers to become tacky and bond to each other, thereby forming a metallurgically integral, porous structure.

17. An improved well screen of the type having a fluid porous, particulate restricting member for separating unconsolidated material out of formation fluid, characterized in that the particulate restricting member is a porous, tubular body of sintered powdered metal formed by the following steps:
   depositing metal slivers having an average length of from about 0.001 to about 0.002 inches into a mold;
   compressing the slivers within the mold until the slivers are interlocked in a structurally stable union; and
   baking the compressed slivers in an oven at a temperature sufficient to cause the slivers to become tacky and bonded to each other, thereby forming a metallurgically integral, porous structure having pore openings in the size range of from about 74 microns to about 100 microns.

18. A well screen as defined in claim 17, including the step of electropolishing said tubular well screen body.

19. A well screen as defined in claim 19, wherein said electropolishing step is performed until the average size of the pore openings in the tubular well screen body is increased to a value in the size range of from about 100 microns to about 200 microns, thereby yielding an effective porosity in the range of from about 40 to about 60 mesh.

* * * * *